United States Patent [19]

Kalmanash

[11] 4,337,420

[45] Jun. 29, 1982

[54] DUAL MODE COLOR SWITCH FOR BEAM PENETRATION CRT

[75] Inventor: Michael H. Kalmanash, Fairfield, Conn.

[73] Assignee: United Technologies Corporation, Hartford, Conn.

[21] Appl. No.: 259,343

[22] Filed: May 1, 1981

[51] Int. Cl.$^3$ ............................................ H01J 29/80
[52] U.S. Cl. .................................... 315/375; 358/73
[58] Field of Search ................... 315/375; 358/72, 73

[56] References Cited

U.S. PATENT DOCUMENTS

| 3,906,333 | 9/1975 | Kalmanash | 315/411 |
| 3,914,617 | 10/1975 | Corbel | 358/73 |
| 4,092,566 | 5/1978 | Chambers et al. | 358/73 |
| 4,281,272 | 7/1981 | Spilsbury | 358/73 |

Primary Examiner—Theodore M. Blum
Attorney, Agent, or Firm—Richard P. Lange

[57] ABSTRACT

A high voltage color switch for beam penetration CRT has two operating modes, the first of which is well suited to displaying a sequential group of colors on the faceplate of a CRT, and the second mode of which is well suited to displaying a random color that varies from a preselected baseline color. A high voltage power supply has an output voltage level which is selected to provide a predetermined baseline color when presented through the secondary winding of a transformer to the anode of a CRT. The primary winding of the transformer is connected through a first switch to the output of a driver. A feedback loop from the output of the driver senses the DC voltage level associated with the input waveform and biases the input of the driver to force the level of DC voltage presented to the primary winding of the transformer to zero. At the same time in the first mode the second switch is open so that the input waveform to the driver circuit is integrated in a low-pass filter into a DC level and then presented to the reference input of the high voltage power supply. In response to changes on its reference input the high voltage power supply changes its output voltage level so that no perceivable change is apparent to a viewer. In its second mode, the color switch can provide a color write period in a random color and the second switch is closed so that the high voltage power supply does not respond to changes in the DC level of the input voltage waveform. In this mode a reset period is necessary so that the magnetizing current in the transformer is returned to the center of its dynamic range.

7 Claims, 3 Drawing Figures

DUAL MODE COLOR SWITCH FOR BEAM PENETRATION CRT

DESCRIPTION

1. Technical Field

This invention relates to a high voltage color switch for a beam penetration CRT, and more particularly, to a color switch which has a first mode for the sequential display of color information and a second mode for the random display of color information.

2. Background Art

A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT strikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increase the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it impossible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest is U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube. This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a dual mode color switch for a beam penetration-type tube in which the color write periods in the first mode step sequentially through the separate colors while in the second mode any one color can be selected randomly for a color write period.

A particular feature of the dual mode color switch for a beam penetration CRT of the present invention is that two separate modes of displaying color information are available. Changing between the two modes is accomplished by means of a pair of switches which are under the control of a color processor.

According to the present invention, a dual mode high voltage color switch for a beam penetration CRT includes a high voltage power supply connected through a transformer secondary winding to the accelerating anode of a CRT. The primary winding of the high voltage transformer is coupled through a switch to the output of a driver circuit. In the first mode of two modes, the sequential mode, a feedback loop senses the DC voltage level associated with the dynamic drive waveform presented to the anode of the CRT through the transformer and drives that DC voltage level to zero. The proper DC voltage is restored to the CRT by adjusting the reference input to the high voltage power supply, thus changing the level of the high voltage output applied to the anode of the CRT. In the second, the just aforementioned feedback circuit is disabled and the beam penetration CRT can be randomly switched to any non-baseline color for a color write period which does not exceed a predetermined length of time. Also, in this second mode, an energy return path is provided through a pair of diodes to recapture energy associated with the collapse of the magnetic field in the high voltage transformer following the end of the write period.

The foregoing and other objects, features and advantages of the dual mode color switch for a beam penetration-type CRT according to the present invention will become more apparent from the following description of the preferred embodiment and accompanying drawing.

BEST MODE FOR CARRYING OUT THE INVENTION

Figure 1:
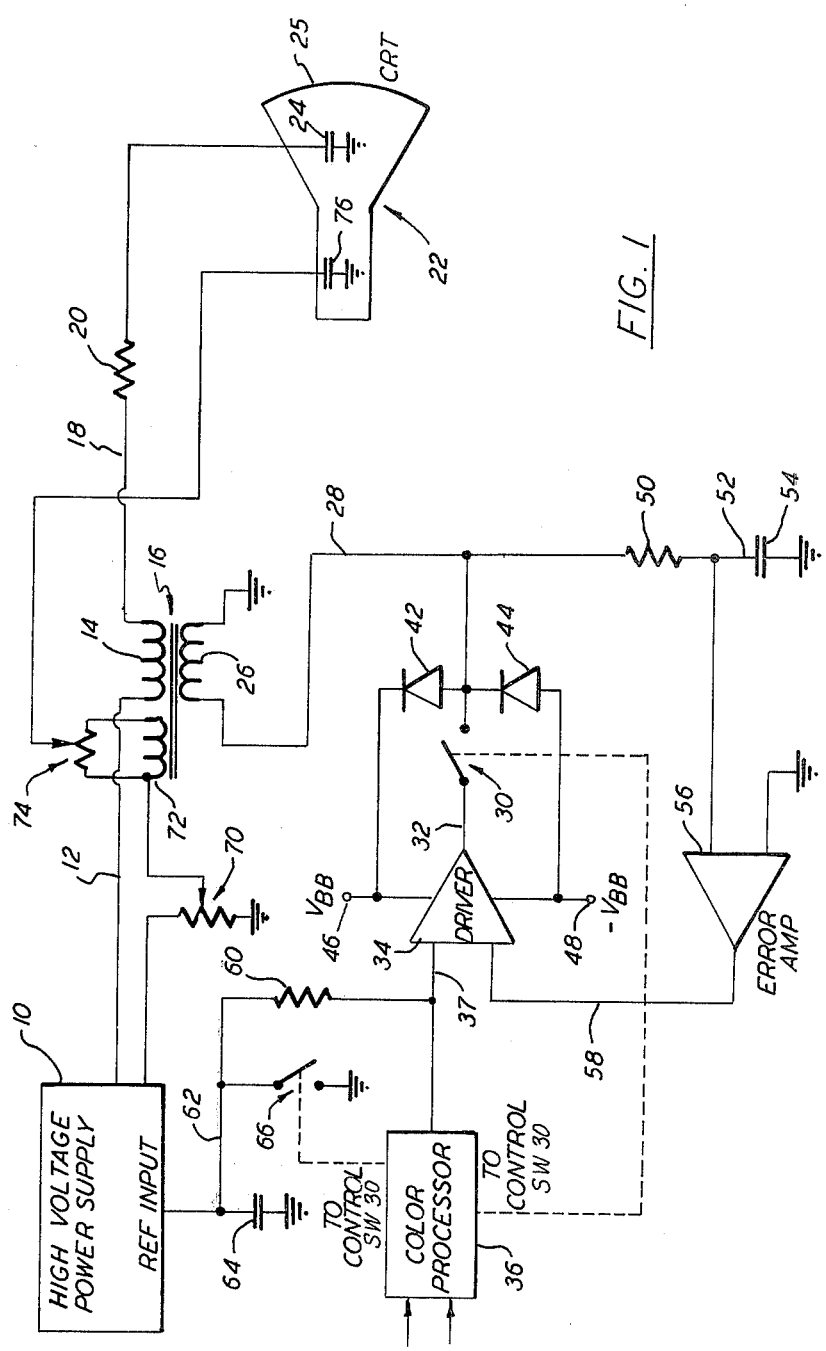
FIG. 1 is a schematic diagram in block form depicting one embodiment of the dual mode color switch for a beam penetration CRT according to the present invention.

Referring initially to FIG. 1, there is seen one embodiment of the dual mode color switch for a beam penetration CRT according to the present invention. A high voltage power supply 10 of a known type is provided and is connected by a line 12 to one side of a secondary winding 14 of a transformer 16. The other side of secondary winding 14 is connected by a line 18 through a damping resistor 20 to a beam penetration CRT (cathode-ray tube) 22. As is known, the CRT 22 includes an anode 24 to which a high voltage is applied, and this high voltage causes the beam of electrons emitted by a cathode (not shown) located in the tube neck to accelerate toward the faceplate 25 located across the front of the CRT 22. The inner surface of the faceplate 25 typically has at least two layers of phosphor deposited thereon, each layer emitting a distinct wavelength or color of light in response to being excited by the electron beam. For the purposes of appreciating the present invention, it will be assumed that there is one layer of green phosphor and one layer of red phosphor on the inner surface of the faceplate 25, but it should be understood that phosphors which emit different colors could be used. In addition, if more than about four distinct colors are to be displayed on the faceplate 25, more than two layers of phosphor could be used. The anode 24 is formed by a material of high conductivity that is positioned circumferentially around the CRT 22 near the front of the CRT 22. Because of its large size, the anode 24 has a relatively high capacitance and, for the purposes of simplicity, is illustrated in the embodiment of FIG. 1 as a capacitor.

The transformer 16 also has a primary winding 28 and has a preselected turns ratio with respect to the secondary winding 14 that is matched to the characteristics of the needed voltage swing in a known manner. For example, in a 1 to 1,000 turns ratio transformer, a 4 V change across the primary winding 26 would result in a 4 KV change across the secondary winding 14. This voltage swing if symmetric about ground potential would result in a swing of the secondary winding from $-2$ KV to $+2$ KV. In the present embodiment, one end of the primary winding 26 is connected to ground while the other end is connected by a line 28 to one side of a switch 30. The other side of switch 30 is connected by a line 32 to the output of a driver 34. The input to the driver 34 is essentially an analog signal with discrete levels, each level indicative of a separate color as will be explained in greater detail hereinafter. The input from the driver 34 is from a color processor 36 on a line 37.

One feature of the present invention is that in its second mode the color switch includes a feedback path from the transformer 16 to the low voltage power supply for the driver 34 so that energy can be returned during the reset period. This feedback path includes a pair of diodes 42 and 44 which are connected in a reverse bias configuration between the line 28 and each half of the low voltage power supply. The low voltage supply (not shown) is of a known type and supplies a positive and negative voltage potential to the driver 34 through the terminals 46 and 48, respectively. Typical voltage levels applied to the driver 34 would be in the range of $+25$ V DC to $-25$ V DC. The anode of the diode 42 is connected to the line 30 while its cathode is connected to the terminal 38. The cathode of the diode 44 is connected to line 28 while its anode is connected to the terminal 48.

In the first mode, the dual mode color switch according to the present invention is stepped sequentially through a series of color write periods, and in order to adjust for duty cycle variation in a particular color write period, a DC feedback loop is provided to adjust the output voltage level from the high voltage power supply 10. This DC feedback loop includes a resistor 50 which has one side connected to the line 28. The other side of the resistor 50 is connected by a lead 52 to a capacitor 54, the other side of which is connected to ground. The resistor 50 and capacitor 54 acts as a low-pass filter which integrates the voltage waveform on the line 28 to the primary winding 26 of the transformer 16. An operational amplifier 56 has one input connected to the line 52 for sensing the DC component of the signal waveform applied to the primary winding. The other input is connected to ground. The output from the operational amplifier is connected via a lead 58 to an input of the driver 34.

In changing the high voltage DC level out of the high voltage power supply 10, a resistor 60 has one end connected to the line 37 while its other side is connected by a line 62 to one side of a capacitor 64. The other side of the capacitor 64 is connected to ground. The line 62 is also coupled to the reference input of the high voltage power supply 10. The resistor 60 and capacitor 64 integrate the signal waveform applied to the driver 34 to form a DC level which proportionally changes the output voltage level from the high voltage power supply 10. A switch 66 is connected between line 62 and ground which under the control of the color processor 36 disables this feedback while in the second mode of operation.

A particular feature of the present invention is that it also provides dynamic tracking color focus voltage for the CRT 22. In preferred form this includes a first potentiometer 70 which is coupled to the output of the high voltage power supply 10. This is a separate output which has a lower DC level than the output used to supply the anode voltage. The first potentiometer 70 is connected through a winding 72 which is an additional winding on the transformer 16 to a second potentiometer 74. The potentiometer 74 is used to provide dynamic adjustment to the voltage applied to the focus electrode 76 which is located near the front portion of the electron gun (not shown). Typically, the focus voltage level applied to the focus electrode is a fixed percentage level of the voltage applied to the anode 24. A particular feature of the present invention is that this focus system requires a minimum of additional parts, only a couple of potentiometers and the additional winding on the transformer 16. The first potentiometer 70 adjusts the DC baseline voltage level while the second potentiometer 74 adjusts the dynamic output to the level applied to the focus electrode 76.

Figure 2:
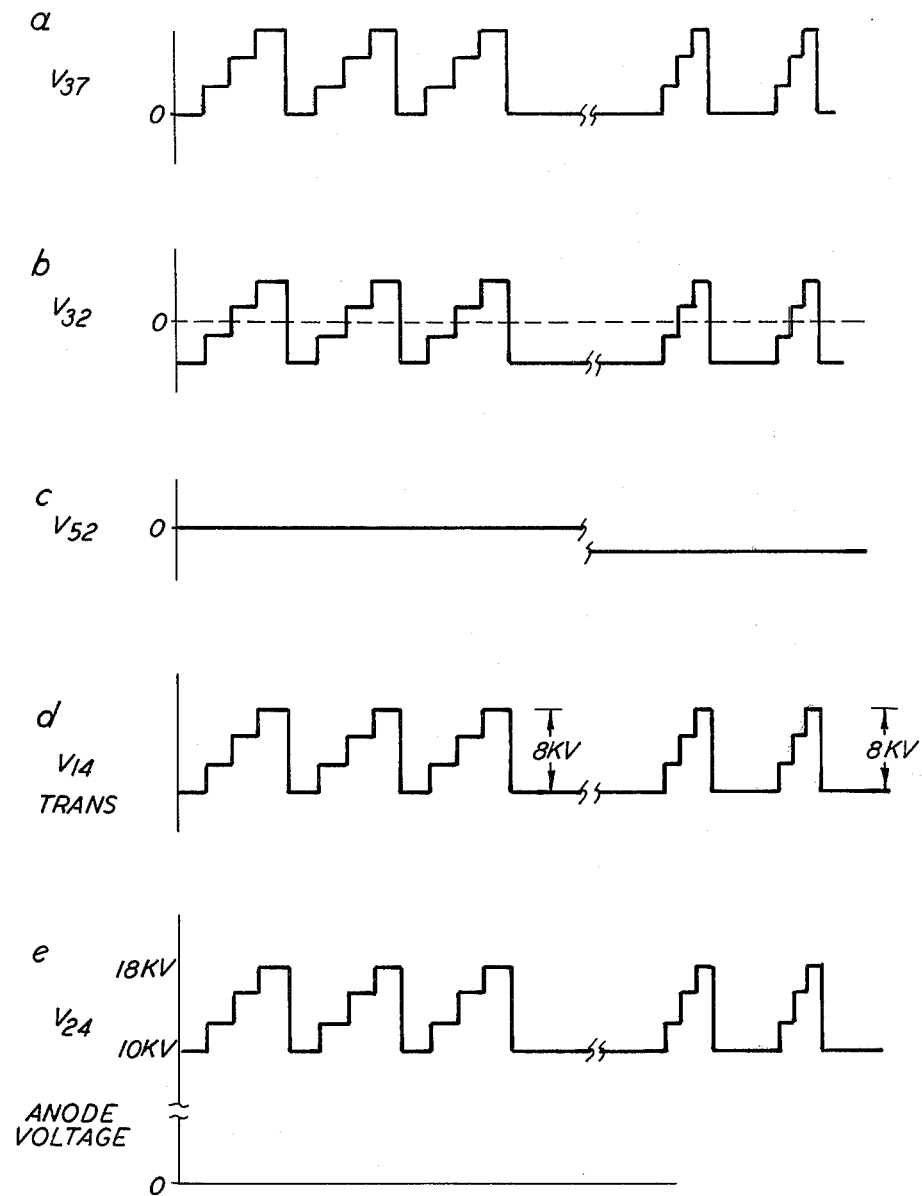
FIG. 2 is a diagram depicting waveforms at various points in the embodiment of FIG. 1 with the color switch in its first mode.

Referring now to FIG. 2, the operation of the dual mode color switch according to the present invention will now be described. Referring first to the left-hand half of FIG. 2, the operation of the color switch of the present invention in its first mode, the sequential mode, will now be described. In this first mode, the color switch is stepped through a color write period for each of four colors by presenting to the accelerating anode 24 a stepped voltage waveform. In other words, the voltage level applied to the anode 24 changes from 10 KV to 12 KV, from 12 KV to 16 KV, from 16 KV to 18 KV, and finally from 18 KV back to 10 KV. As is seen in the left-hand half of FIG. 2, the duty cycle of this waveform is such that the dwell time during each color write period is about the same so that the overall DC level of this waveform does not change with time.

Referring next to the right-hand half of FIG. 2, the operation of the dual mode color switch in the first mode is seen in which one of the color write periods is longer than the other. In other words, an unsymmetric voltage waveform is presented to the anode 34, this unsymmetric voltage waveform having an average DC level associated with it. Because the switch 66 is open in this mode, the resistor 60 and the capacitor 64 act as a low-pass filter which integrates the voltage waveform presented to the driver 34. This voltage level is fed to the reference input of the high voltage power supply 10 and adjusts the level of the high voltage output to line 12. The switch 30 remains closed while the dual mode color switch is in this first mode.

Figure 3:
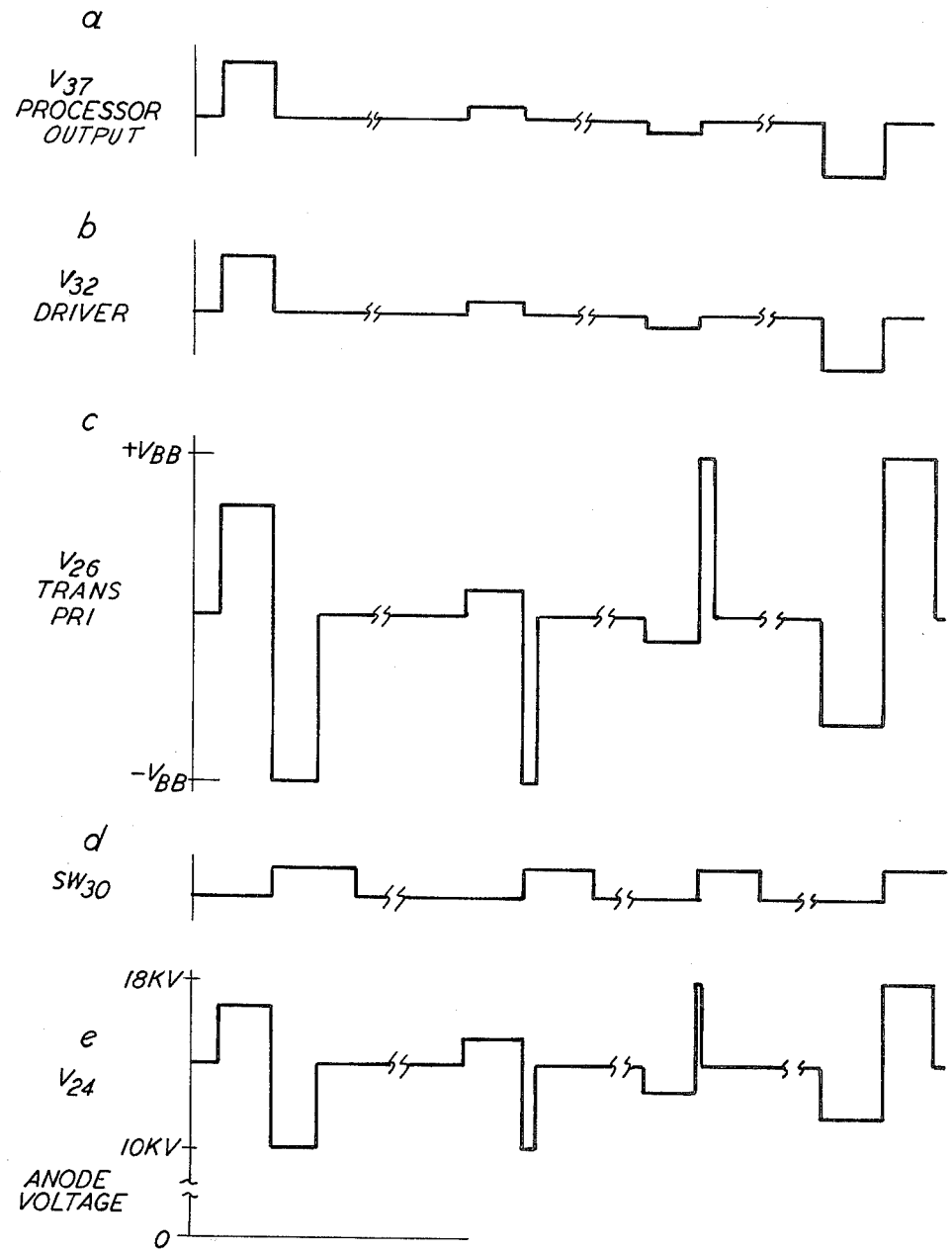
FIG. 3 is a diagram depicting waveforms at various points in the embodiment of FIG. 1 with the color switch in its second mode.

Referring next to FIG. 3, the operation of the dual mode color switch according to the present invention will now be described with the mode switch in the second mode, the random access mode. Although the color switch can be cycled through a write period for any of its available colors, for the purposes of illustration, a yellow write period and a red write period will be illustrated. This mode is well suited to the situation where the baseline color, here being approximately orange, is to be used to display information on the faceplate 25 of the cathode-ray tube 22 for the majority of the time. However, at certain times, e.g., to highlight a particular item on the screen it may be desirable to display just that image in, for example, yellow or red. In its second mode, the dual mode color switch of the present invention can be randomly changed to any color write period so that such information can be written on the faceplate 25.

Referring now to the left-hand side of FIG. 3, there is seen a sequence during which a yellow write period is formed. At time $t_0$ the binary signal from the external source indicates that a yellow color write period is to be initiated. The switch 62 receives an enable signal from the color processor 36 shunting any DC voltage level on the capacitor 64 to ground. The switch 30 remains closed during the write period until the reset period. At time $t_1$ a control signal from the color processor 36 opens the switch 30 which interrupts the current flow from the driver 34 to the primary winding 26 of the transformer 16. The magnetic field in the transformer 16 begins to collapse creating, if unchecked, a significant voltage. One of the diodes 42 or 44, depending on the polarity of the primary current, begins to conduct. A feedback path is formed through the conducting diode to the low voltage power supply. Also at time $t_1$, the drive circuit 34 is pulsed (FIG. 3d) by a voltage waveform from the color processor 36 to a voltage level and polarity on the opposite side of the baseline voltage level, this being 10 KV. By time $t_2$ the magnetizing current in the transformer 20 has been fully recaptured so that finally by time $t_4$, at the end of the reset period, the switch 30 is enabled, closing the path from the driver circuit 34 to the secondary winding 26. The voltage level on the anode 24 has now been returned to the 14 KV level of the baseline color, orange.

In order to utilize the full benefit of the dual mode color switch in the second mode, it should be recognized that it is desirable to match the characteristics of the transformer 16 to the maximum write period in any one non-baseline color. This is because the voltage applied by the driver 34 to the primary winding 26 creates a magnetizing current that inherently increases the core flux density. If the peak flux density were permitted to reach the saturation level of the transformer, the resulting saturation would cause a droop in the level of high voltage applied to the anode 14 and, as the voltage level faded, a corresponding change in the color displayed on the faceplate 25 of the CRT 22. As will be appreciated by those of ordinary skill, to increase the length of a write period in a given color, a larger transformer with a higher saturation level should be used. Correspondingly, if a shorter write period for a given color is acceptable, a smaller transformer with a lower saturation level can be used, thus making the drive circuit smaller and more compact. Referring now to the right-hand side of FIG. 3, there is seen an example of the situation where the anode 24 is pulsed to an extreme position, a 10 KV level, for a red write period. At time $t_5$ the binary input to the color processor causes it to generate a pulse to the driver circuit 34. The driver circuit 34 then forms a corresponding pulse in the primary circuit which initiates the magnetizing current in the primary winding 26. By time $t_6$ the write period for the color red has reached its maximum interval and the flux density in the transformer 16 is approaching its saturation point. The reset interval begins with the opening of the switch 30 by a signal from the color processor 36. A pulse of opposite polarity is initiated in the transformer as the flux collapses. This allows the magnetic current to discharge through the diode 42 and the magnetic current is recaptured by the low voltage power supply. Finally, by time $t_7$, when the voltage level has reached that corresponding to the baseline color, 14 KV level, the switch 30 is enabled closing the path from the output of the driver 34 to the secondary winding 26.

Although this invention has been shown and described with respect to a preferred embodiment, it will be understood by those skilled in this art that various changes in form and detail thereof may be made without departing from the spirit and scope of the claimed invention.

I claim:

1. A high voltage color switch for a beam penetration cathode-ray tube having a first mode in which color write periods of different colors are formed in a sequential manner, and a second mode in which a baseline color is normally displayed but color write periods in random colors can be formed, comprising:

high voltage power supply means having a reference input and a high voltage output level selected to provide a predetermined baseline color when presented to said cathode-ray tube;

Transformer means connected between the output of said high voltage power supply means and said beam penetration cathode-ray tube;

driver means for receiving an input waveform at an input and amplifying the same presentation to said transformer for providing the needed swing to generate a particular color in a color write period;

First switch means having an open position and a closed position, and connected between the output of said driver means and said transformer means;

integration means connected between said input of said driver means and the reference terminal of said high voltage power supply;

second switch means connected to said integration means for disabling it in the second mode; and whereby in said first mode for displaying color write periods of different colors in a sequential manner said second switch means is open so that the DC level associated with the input waveform is presented to said reference input of said high voltage power supply to correspondingly adjust its high voltage output level at the same time said first switch means is closed so that said input voltage waveform is presented to said driver means, but in said second mode said second switch is closed, disabling said integration means so that a color write period in a random color can be generated.

2. A high voltage color switch according to claim 1, wherein said driver means further includes a low voltage power supply to which energy is returned when the magnetizing current in said transformer means is reset after each color write period.

3. A high voltage color switch according to claim 2, wherein said low voltage power supply a positive portion and a negative portion, and wherein said diode means includes a pair of diodes, each of which is connected from the output of said driver means to the positive and negative portions of said low voltage power supply.

4. A high voltage color switch according to claim 1, wherein said cathode-ray tube includes a focus electrode to which a high voltage is applied to focus the electron beam, and further including a means for providing a focus voltage that tracks the high voltage level applied to said anode of said cathode-ray tube.

5. A high voltage color switch according to claim 4, wherein said means for providing a focus voltage includes a focus voltage winding on said transformer means connected between said high voltage power supply and said focus electrode of said cathode-ray tube.

6. A high voltage color switch according to claim 5, wherein said means for providing a focus voltage includes a first potentiometer connected between said high voltage power supply and said focus winding of said transformer means for proportionally adjusting the voltage level from said high voltage power supply.

7. A high voltage color switch according to claim 6, wherein said means for adjusting the focus voltage further includes a second potentiometer coupled across the focus winding of said transformer means to proportionally adjust the voltage swing applied to said focus electrode.

* * * * *

UNITED STATES PATENT AND TRADEMARK OFFICE
CERTIFICATE OF CORRECTION

PATENT NO. : 4,337,420

DATED : June 29, 1982

INVENTOR(S) : MICHAEL H. KALMANASH

Page 1 of 2

It is certified that error appears in the above—identified patent and that said Letters Patent is hereby corrected as shown below:

Column 1, after the Title, insert the following:

-- Cross Reference to Related Applications

The subject matter of this patent application is related to that disclosed in U.S. Patent Application Serial No. 259,344 filed May 1, 1981 by M. H. Kalmanash for IMPROVED SEQUENTIAL COLOR SWITCH FOR BEAM PENETRATION CRT; to U.S. Patent Application Serial No. 259,342 filed May 1, 1981 by M. H. Kalmanash for RANDOM COLOR SWITCH FOR BEAM PENETRATION CRT; to U.S. Patent Application Serial No. 259,381 filed May 1, 1981 by M. H. Kalmanash et al for DIFFERENTIAL RANDOM COLOR SWITCH FOR BEAM PENETRATION CRT; to U.S. Patent Application Serial No. 259,383 filed May 1, 1981 by M. H. Kalmanash for STROKE DURING RETRACE COLOR SWITCH; to U.S. Patent

UNITED STATES PATENT AND TRADEMARK OFFICE
CERTIFICATE OF CORRECTION

PATENT NO. : 4,337,420
DATED : June 29, 1982
INVENTOR(S) : MICHAEL H. KALMANASH

It is certified that error appears in the above-identified patent and that said Letters Patent are hereby corrected as shown below:

Application Serial No. 259,394 filed May 1, 1981 by M. H. Kalmanash for CONSTANT CURRENT BIAS COLOR SWITCH FOR A BEAM PENETRATION CRT; and to U.S. Patent Application Serial No. 284,831 filed July 20, 1981 by M. H. Kalmanash for MODULAR HIGH SPEED COLOR SWITCH, all of which are assigned to the same assignee as the present case. --

Signed and Sealed this

Fourteenth Day of September 1982

[SEAL]

Attest:

GERALD J. MOSSINGHOFF

Attesting Officer     Commissioner of Patents and Trademarks